Sept. 29, 1959  H. WAGNER  2,906,136
HYDRAULIC POWER STEERING MECHANISM
Filed Dec. 6, 1955
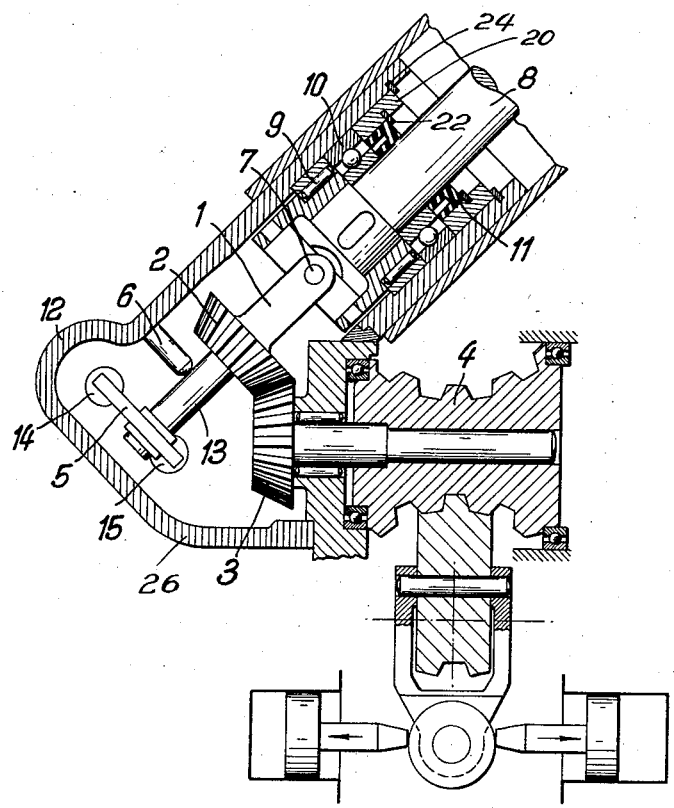
Inventor:
HEINRICH WAGNER,
BY Parby & Grise
ATTORNEYS

United States Patent Office 2,906,136
Patented Sept. 29, 1959

2,906,136

HYDRAULIC POWER STEERING MECHANISM

Heinrich Wagner, Schwaebisch Gmuend, Germany, assignor to Zahnradfabrik Friedrichshafen, Friedrichshafen am Bodensee, Germany Application December 6, 1955, Serial No. 551,432

Claims priority, application Germany December 10, 1954

6 Claims. (Cl. 74—388)

This invention relates to steering mechanism and more particularly to hydraulic servo steering mechanism.

In the prior art a servo power steering mechanism is known in which a worm shaft is driven by a swinging shaft set parallel thereto via a pair of spur gears. For example, such a mechanism is shown in U.S. Patent No. 2,650,669 to Hammond wherein the end of the swinging shaft having a spur gear attached thereto is movable in the course of steering because of the reaction to pressure exerted on the teeth of the gear. Such movement is oblique to the axis of the worm shaft and the swinging shaft, the swinging shaft being movably carried at the end of a steering rod. The movement of the swinging shaft is utilized to actuate hydraulic valves which operate a servo motor. In this known construction the inside of the steering rod housing, which is under pressure of return oil flow, is equipped with a gasket that fits around the swinging shaft in order to prevent leakage, such swinging shaft being mounted in a ball-shaped bearing bushing located near the gasket. The end of the swing shaft which protrudes from the steering rod housing moves arcuately with the ball shaped bearing bushing as its center. Accordingly, it is necessary to attach the swinging shaft to the fixed steering wheel shaft by means of two Cardan joints via a jack shaft. It was found that the gasket, for example, as shown in Fig. 8 of the above-mentioned patent, becomes loose after a certain amount of usage since it has to absorb the swinging motion of the shaft. Such damage to the gasket obviously renders the hydraulic system unreliable. Further, the ball-shaped bearing bushing causes friction which delays the action of the valves.

The purpose of the present invention is to overcome the disadvantages outlined above in a simple but effective construction.

Briefly, the present invention contemplates a substitution of a single Cardan joint for the ball-shaped bearing bushing in the steering rod housing wherein the Cardan joint is attached intermediate the swinging shaft and the fixed steering wheel shaft. The steering wheel shaft is mounted immediately above the Cardan joint in the steering rod housing whereby two advantages are realized. Firstly, no Cardan joints are needed outside the housing, and secondly, the steering rod housing may be tightly fitted along the fixed part of the steering wheel shaft in such a manner that the sealing gasket would not have to absorb the lateral movements of the steering wheel shaft and thereby be worn to the point of leakage. A detailed description of the invention will now be given in conjunction with the appended drawing, in which: Fig. 1 is a cross-section through a steering mechanism comprising the invention. Fig. 2 is a partial section to an amplified scale of certain components of the invention. Fig. 3 is a partial section of a valve device taken in the direction indicated by the arrow A in Fig. 2.

Referring to the drawing, a swinging shaft 1 carries a bevel gear 2 which gear engages a fixed bevel gear 3 that operates the worm 4 and roller steering arrangement shown. A valve control arm 5 is mounted rotatively on the elongation 13 of the swinging shaft 1, which shaft is rotative about the axis of a Cardan joint 7 carried at the lower end of a steering wheel shaft 8. The shaft 8 is mounted in suitable housing by means of a needle bearing 9 and an axial bearing 10, which bearings are adjacent the Cardan joint. The inside of the housing is understood to be filled with oil under return flow pressure from the hydraulic servo mechanism. A gasket 11 is carried in the housing surrounding the shaft 8, and is supported by the shaft and absorbs no lateral movements. Accordingly, its life is correspondingly prolonged. The gasket may be held in place by a suitable collar 20 and a lock washer 22 which collar 20 is in turn held in place by a lock washer 24 carried in the end housing 26.

When the shaft 8 is rotated, the bevel gear 2 effects a rolling motion around the bevel gear 3 which motion is brought about as a result of the pressure of the teeth of these gears against each other. Accordingly, the valve control arm 5 is actuated to operate valves such as generally indicated at 14, 15, 14', 15'. A fixed pin 6 is provided to prevent lateral deviation of the swinging shaft 1 which might cause disengagement of the bevel gears.

Thus, by mounting the swinging shaft 1 in a Cardan joint interiorly of the steering rod housing very little friction is experienced by the movement of the swinging shaft. Accordingly, the swinging shaft can move freely and contact and engage the valves whenever the shaft 8 is rotated. The bearings 9 and 10 and the Cardan joint 7 always operate submerged in oil so as to afford smooth control at all times, requiring a minimum of effort.

In Fig. 2, the steering arm 5 is shown mounted rotatably at the end of the element 13 by means of the needle bearing 16.

The valve control arm 5 is mounted between four pusher rods of spring (not shown) loaded type valves 14, 15, 14', 15'. The element 5 is movable both in the direction of the arrows B and in the opposite direction. The valves are mounted in a support bracket 21, and are actuated by element 5.

In their normal position, the valves are closed and rest against element 5. The valves control the pressure agent through the conduit-pipes 17, 18, 19, 20 and 17', 18', 19', and 20', leading to the servo-motors (not shown).

The mode of operation of the valves may be substantially the same as in Hammond Patent No. 2,650,669, hereinabove mentioned. However, it will be understood by persons skilled in the art that other types of valve actuation and structure for moving the valves may be utilized. The particular valve arrangement and actuation does not form part of the present invention and, accordingly, need not be described in detail herein.

I claim:

1. In a hydraulic power steering mechanism, a housing, a steering rod, a Cardan joint comprising a swingable element carried at the end of said rod and carrying a bevel gear, a valve actuating element disposed to be actuated by said swingable element when said steering rod is rotated, and an additional bevel gear engaged by said first-mentioned bevel gear to effect swinging of said swingable element when said rod is rotated.

2. In a device as set forth in claim 1, including means against which said swingable element may abut to prevent disengagement of said bevel gears.

3. In a device as set forth in claim 1, including a housing surrounding said steering rod, bearings supporting said rod within said housing, and a gasket intermediate said rod and said housing to prevent leakage from said housing toward the end of said steering rod.

4. In a device as set forth in claim 1, said swingable element being an elongated member, said first mentioned bevel gear being disposed intermediate the length of said member, said valve actuating element being carried on said elongated member adjacent an end thereof, the other end of said member being pivoted at the end of said steering rod.

5. In a hydraulic power steering mechanism, a housing, a steering rod, a Cardan joint comprising a swingable element carried at the end of said rod and carrying a bevel gear, a valve actuating element disposed to be actuated by said swingable element when said steering rod is rotated, and an additional bevel gear engaged by said first-mentioned bevel gear to effect swinging of said swingable element when said rod is rotated, including means against which said swingable element may abut to prevent disengagement of said bevel gears, said swingable element being an elongated member, said first-mentioned bevel gear being disposed intermediate the length of said member, said valve actuating element being carried on said elongated member adjacent an end thereof, the other end of said member being pivoted at the end of said steering rod.

6. In a device as set forth in claim 5, including a housing surrounding said steering rod, bearings supporting said rod within said housing, and a gasket intermediate said rod and said housing to prevent leakage from said housing toward the end of said steering rod.

References Cited in the file of this patent

UNITED STATES PATENTS 2,757,643   Hunter _____ Aug. 7, 1956